United States Patent [19]

Schwartz

[11] Patent Number: 4,636,876
[45] Date of Patent: * Jan. 13, 1987

[54] AUDIO DIGITAL RECORDING AND PLAYBACK SYSTEM

[75] Inventor: David M. Schwartz, Denver, Colo.

[73] Assignee: CompuSonics Corporation, Denver, Colo.

[*] Notice: The portion of the term of this patent subsequent to Sep. 18, 2001 has been disclaimed.

[21] Appl. No.: 651,111

[22] Filed: Sep. 17, 1984

Related U.S. Application Data

[63] Continuation-in-part of Ser. No. 486,561, Apr. 19, 1983, Pat. No. 4,472,747.

[51] Int. Cl.⁴ .......................... G11B 5/00; G10L 5/02
[52] U.S. Cl. ........................................ 360/32; 381/51
[58] Field of Search ...................... 381/51, 41; 360/32; 328/14

[56] References Cited

U.S. PATENT DOCUMENTS

| | | | |
|---|---|---|---|
| 4,164,020 | 8/1979 | Griffith | 364/718 |
| 4,368,988 | 1/1983 | Tahara et al. | 381/51 |
| 4,441,201 | 4/1984 | Henderson et al. | 381/51 |
| 4,458,110 | 7/1984 | Mozer | 381/51 |
| 4,519,027 | 5/1985 | Vogelberg | 381/51 |

Primary Examiner—Vincent P. Canney
Attorney, Agent, or Firm—Jerry W. Berkstresser

[57] ABSTRACT

A microcomputer system for converting an analog signal, such as an audio signal representative of sound into a digital form for storing in digital form in a highly condensed code and for reconstructing the analog signal from the coded digital form is disclosed. The system includes reductive analytic means where the original digital data stream is converted to a sequential series of frequency spectrograms, signal amplitude histograms and waveform code tables. Approximately 100 times less storage space than previously required for the storage of digitized audio signals of high fidelity quality is thereby obtained. Additive synthesis logic interprets the stored codes and recreates an output digital data stream for digital to analog conversion that is nearly identical to the original analog signal.

26 Claims, 7 Drawing Figures

FIG. 4

NOTE: PARITY BITS NOT SHOWN

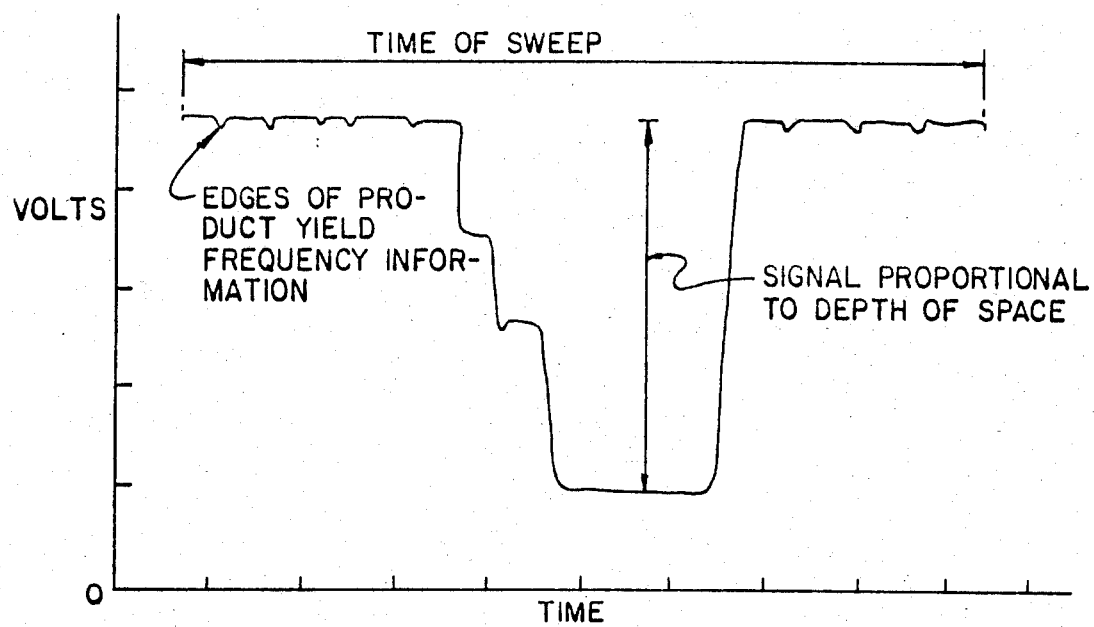
FIG. 7 ANALOG SIGNAL REPRESENTING SHELF CONTENTS

AUDIO DIGITAL RECORDING AND PLAYBACK SYSTEM

This application is a continuation-in-part of Ser. No. 06/486,561, now U.S. Pat. No. 4,472,747 filed 4/19/83.

BACKGROUND OF THE INVENTION

Conventional recording of sound and playback is performed by electronic systems of the analog type. The sound waves from a source being recorded are converted to electrical signals on a one to one basis; the acoustic sound waves have their analogy in the electrical current generated by the microphone or preamplifier circuit such as used in a receiver, turntable or magnetic tape source. On playback the electrical signal is amplified and used to drive loudspeakers which convert the electrical signal to sound waves by the mechanical motion of an electromagnet and speaker cone.

Similarly, the output of conventional recording and playback systems consists of electrical signals in the form of signal waveforms either cut into a vinyl medium or imposed on magnetic particles on tape. On playback, the signal waveforms are converted into sound waves as described above. The accuracy of the reproduced sound wave is directly dependent on the quality of the metal or plastic disk or of the tape itself. Both the production of disk copies and tapes and their means of playback tend to degrade the quality of the reproduced analog signal. Noise, in the form of contamination, wear and the inherent background output of the medium itself is therefore unavoidably present in the recording and playback systems utilizing conventional analog to analog recording and playback technology. Recent developments in audio-digital sound recording and playback systems represent efforts to reduce or eliminate this noise problem. Exemplary of such developments are the kinds of systems and equipment disclosed in the following patents: Meyers et al, U.S. Pat. No. 3,786,201 issued Jan. 15, 1974; Borne et al, U.S. Pat. No. 4,075,665, issued Feb. 21, 1978; Yamamoto, U.S. Pat. No. 4,141,039, issued Feb. 20, 1979; Stockham, Jr. et al, U.S. Pat. No. 4,328,580 issued May 4, 1982; Tsuchiya et al, U.S. Pat. No. 4,348,699 issued Sept. 7, 1982; and Baldwin, U.S. Pat. No. 4,352,129 issued Sept. 28, 1982, the disclosures of which are specifically incorporated herein by reference. These systems are characterized generally as taking advantage of the high speed operation of the digital electronic computers. The signal waveform, representative of sound in such digital sound recording and playback systems, is frequently sampled to produce a serial stream of data that is translated into a binary code that assigns a numerical value for each sample. This can be visualized as slicing up a continuous curve into a large number of very short step-like segments. The process is reversed on playback as each numerical value of each segment is converted into an output voltage. When this process is done rapidly enough, the fact that the signal wave form representative of a sound wave has been "chopped up" and re-assembled cannot be detected by the human ear. When sound is recorded in digitized binary code in this manner, the sound, such as music, is only a series of numbers represented by magnetic tracks on a recording medium which, when read by the appropriate electronic means, are either "on" or "off" with no intermediate values. Such binary signals are virtually immune to distortion, error, and degradation with time. All sources of noise normally associated with analog devices are eliminated that is, there is no tape hiss, no tracking errors, no surface effects. Signal to noise ratios are limited, only by the digital to analog conversion circuit itself and the power amplifiers, rather than the sensitivity of the mechanical or magnetic analog to analog conversion circuitry.

These systems do, however, have several drawbacks. A representative system currently in use for recording master tapes in the record industry has excellent audio qualities as a result of a high speed sampling rate of 50 KHz and good digital binary code resolution in the form of a 16 bit word for each sample. The problem with this system is that every sample must be preserved in mass storage for playback. The storage system thus must hold on the order of 4,320,000,000 bits of information for a 45 minute record. Storage systems of this capacity are large, expensive, and generally not suitable for a consumer product.

Attempts to resolve the storage capacity problem have taken the approach of reducing the resolution of each sample (fewer bits per "word") while at the same time reducing the sampling rate (to 12 khz). Such reductions have reduced the data storage requirement by as much as a factor of 4. The resulting fidelity of the output, however, is often below that acceptable for high fidelity sound recordings of music.

Another approach much favored by telephone companies, employs the foregoing reduction of bits described above and in addition adds the restriction of input signal band width to that most used by talking voices (3 to 8 KHz). A total data reduction factor of about 12 is possible in this manner, again accompanied with a reduction in sound quality.

Recent attempts at a solution to the storage problem and the fidelity reduction problem utilizes ultra high density digital storage by laser recording technology. This has been partially successful in that adequate playing times have been achieved with the improved storage capacity. However, the manufacturing technology and equipment presently necessary to create a "laser-burned hole", "pit", or "black spot" in the storage medium restricts "laser disks" or "laser fiches" to the "playback only" mode with no potential for in-home recording or erasing and editing.

It is therefore an objective of the present invention to provide a system for high fidelity sound recording and playback that does not have the foregoing drawbacks and associated problems.

SUMMARY OF THE INVENTION

The present invention is yet another approach to a solution to the storage and reproduction problems associated with digital audio recording and play back systems described herein. Good fidelity can be achieved with limited computer storage capacity by the provision of unique electronic signal processing means which: (1) converts analog data to digital data stream samples; (2) selects portions of the samples to produce at least three data streams indicative of amplitude, frequency and waveform characteristics; (3) stores data samples indicative of waveform having a predetermined time duration, comparing each such sample of waveform data against predetermined waveform parameters to select and preserve only predetermined portions, said waveform data samples matching the preserved portions with pre-existing waveform and real time data and generating a resultant waveform data code from such comparison, and then comparing the selected data from the data streams which are indicative of frequency and amplitude with the waveform data code to produce another data code proportional to the frequency and amplitude of the original analog signal, sequentially recording the data stream indicative of amplitude, the data code indicative of frequency and amplitude, and the data code indicative of waveform, onto a recording media, for subsequent playback by the processing of the sequentially recorded data.

BRIEF DESCRIPTION OF THE DRAWINGS

FIG. 4 is a pictorial representation of a single unit of binary code as stored on disk, from which reproduction will be obtained according to the system of the present invention.

FIG. 7 represents an analog signal output of the apparatus of FIG. 6.

DETAILED DESCRIPTION OF THE INVENTION

The present invention provides a system for converting input analog signals such as audio signals into digital signals and subsequently coded into structured data sets for recording in condensed digital form; and, for reconstructing a digital data set similar to the original digital signal input prior to reconversion to the analog form of signal.

In its broadest sense, therefore, the recording of the audio signals into a digital form for subsequent playback is accomplished by the provision of a microcomputer recording system which comprises electronic components for converting an analog audio signal into at least three digital data streams, wherein the first of the digital data streams is a relatively broad band reference signal representative of the amplitude of a pre-selected range of audio frequencies, and the second of said data streams is produced by filtering the analog audio signal to produce at least one data stream channel indicative of a sampled band width of frequencies narrower than the band width represented by such first data stream, and a third reference data stream representative of the sampling frequency of the audio signal; sampling means for producing a sequential stream of data samples from each of the digital data streams, selection means for selecting a pre-determined portion of the digital data sample produced by the sampling means in each of the data streams; means for separately storing each of said selected digital data samples produced by the sampling means; means for comparing the reference signal data stream containing amplitude data with said second data stream containing frequency data to produce frequency spectrogram data representative of the frequency and amplitude of the original audio signal; means for transforming data samples of the third data stream channel selected from the narrower band width into data representative of a time versus amplitude histogram for each band width; means for comparing said histogram data with selected waveform parameters and producing and storing addressable data representative of the waveform of the original audio input and means for sequentially assembling and storing the frequency spectrogram data and the amplitude reference data of the first data stream and the addressable waveform data for subsequent playback use.

Figure 1:
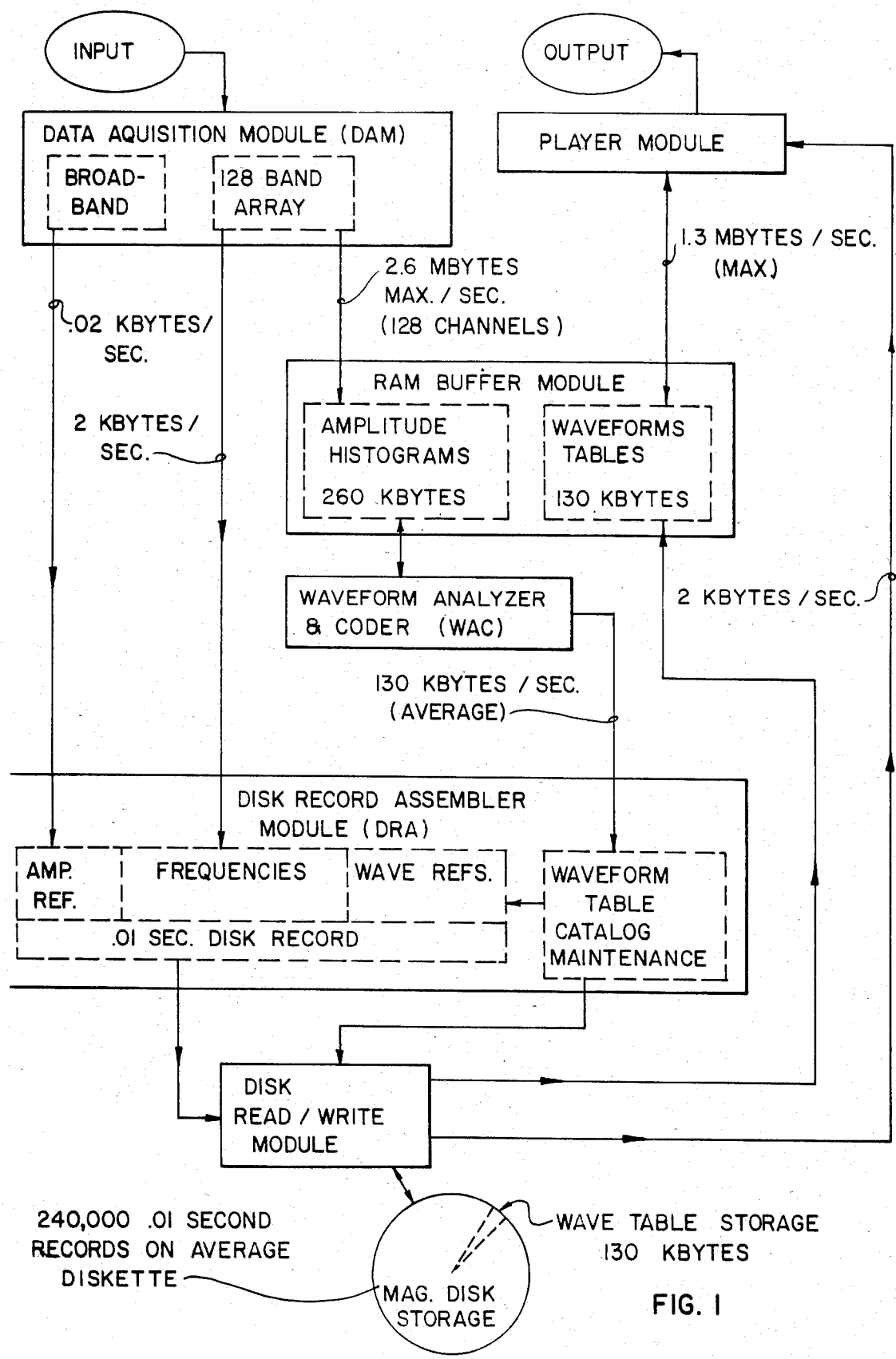
FIG. 1 is a schematic diagram of the digital recording and playback systems of the present invention.

In the preferred embodiment shown in FIG. 1, the input signal is conditioned and amplified in the first stage of the Data Acquisition Module (DAM). The DAM is a multi-channel programmable microprocessor based device that utilizes standard integrated circuits to perform three functions:

1. To sample at the rate of 42 Khz, hold, digitize, and output the broadband (20 hz to 20 Khz) audio signal level (dc voltage) of amplitude every 0.01 second. Thus, 100 times every second a digital "word" composed of from 4 to 14 bits is created for assembly as part of a disk record file.

2. To sample, hold, digitize and output an audio frequency spectrogram every 0.01 second from a 128 segment array of logical bandpass filters which sample 128 channels and are arranged logarithmically over the overall band width used. The data set produced by this function may range from null (no signals on any channel) to (n) [(7 bit identifier+(7 bit scaler)+(2 bit pointer)] where (n) is the number of channels with signal content.

3. To act as a digital storage oscilloscope loader, assembling strings of digitized amplitude versus time data (histograms) corresponding to the array of bandpass filters selected in paragraph 2, above. This assembled data set is produced every 0.01 second and is the largest single data structure and contains time continuous listing for every active bandpass filter. The number of "words" in each string is a function of the filter center frequency and requires as many as 4,000 samples for a 20 Khz channel, or as few as five samples for a 20 hz channel. This data set is not sent to the file assembler as in paragraphs 1 and 2, above, but is loaded into a Random Access Memory (RAM) buffer where it is accessible by the Waveform Analyzer and Coder module.

The function of the Waveform Analyzer and Coder module (WAC FIG. 1) is to be a digital numeric processor array that is programmed to extract characteristic waveforms from the data set stored in the RAM by the DAM described above. The waveform data are reduced to tabular form in which one period of each waveform codified is assigned to one wave table which preferably is a digitized x-y coordinate system consisting of 1,024 bytes along the x axis and an 8 bit "word" in each byte location to scale the y axis in 256 increments; 127 above zero and 127 below. A set of wavetables is therefore generated for all active bandpass filter channels every 0.10 second. A range of 0 to 128 P.M.S. tables may be generated per cycle (0.01 second).

The WAC utilizes either one of several P.M.S. reductive analytic methods to find waveforms. The first being the Fast Fourier Transform (FFT) and the second the Fast Delta Hadamard Transform (FDHT). The two methods may be briefly described as follows:

The FFT is based on the principal that almost any periodic function f(x) of period 2 of vibrations can be represented by a trigonometric series of sines and cosines. The full expression in general terms is:

$$f(x) = \frac{1}{2\pi} \int_{-\infty}^{\infty} \left[ \int_{-\infty}^{\infty} f(v)e^{iw(x-v)}dv \right] dw$$

The algorithm for executing this equation efficiently was first published by Rabiner & Gold, 1974 and Oppenheim and Schafer, 1975.

The FDHT is utilized for the analysis of spectral composition of a data set where the spectrum Ψ is in the form:

$$\psi(f) = \sum_{i=0}^{n-1} i\, \delta[F - (Fi + 1 + Fi)/z]$$

where Fi is the frequency and Ψ i is signal intensity. In the present application of this method the digital output of the logical filters from hereinbefore numbered paragraph 2, is summed at each filter and added to the next output until all frequencies have been sampled. At the last step the total output is:

$$\eta j = \sum_{i=0}^{n-1} Si + j\psi i$$

Then an estimation of the spectrum (Ψ') can be found by matrix multiplication:

$$\psi' = \frac{1}{n} S^B \cdot \eta = \frac{1}{n} S^B \cdot S \cdot \psi = \psi$$

The algorithm for implementing the FDHT was published in 1983 by E. E. Fenimore at Los Alamos National Laboratory.

B-splines computational algorithms may also be employed to extract characteristic waveforms.

Ten times every second the latest produced set of waveform tables are sent to the Disk Record Assembler (DRA FIG. 1).

The Disk Record Assembler (DRA) is a program module that receives as input the waveform table references (addresses) from the WAC every 0.10 seconds and paragraph 2 (above) frequency spectrogram data sets every 0.01 seconds directly from the Data Acquisition Module (DAM) as well as the digital word representing the total broadband signal strength. The waveform tables are kept in a local memory buffer in the DRA so that they may be revised or discarded every 0.10 second cycle by a subroutine which for convenience will be called Waveform Catalog Maintenance. Disk records (FIG. 4) for storage are variable in length but always follow this format: the first 14 bits are the field length statement, the next 7 bits are the frequency filter or channel identifier followed by a 2 bit pointer (flag) and its 7 bit scaler, 7 bit waveform table identifier, 7 bit simultaneous waveform table identifier (repeat if necessary), 2 bit flag (signals next filter identifier), and so forth to the last 14 bit word which is the broadband signal level. The data stream format is shown graphically in FIG. 4.

Once a record is prepared for storage it is held in a local memory buffer in the DRA for one cycle so it can be compared to the next sequential record. This allows the DRA to utilize "tokens"; specific reserved symbols to identify "repeats", "same excepts" and "nulls" in the current record being assembled to save storage space.

The Waveform Catalog Maintenance Subroutine is programmed to evaluate incoming updates of waveform tables against the waveform tables previously stored, and among themselves. Since there are only 128 channels available for storage of the amplitude histogram output of the DAM, the comparison of the waveform output of the WAC with the stored waveform data of the DRA determines redundancy and duplicates are discarded. The remaining incoming tables are possibly unique or simply improved versions of forms already stored. Waveforms that contain new features on existing tables are saved in place of their previous table resident. Unique forms are assigned new tables. When an overload occurs due to a "full house" and a unique waveform arrives it is placed in a local buffer for one cycle to determine its repetitiveness. If indeed it does occur in the next 0.10 second cycle, space in the Waveform Catalog is made for it by discarding the waveform most similar to another in the Catalog. The algorithms used for these evaluations are based on standard statistical methods for measuring the fit of two curves to one another.

In the preferred embodiment of this invention the storage medium is a 5.25" magnetic disk commonly in use for digital magnetic storage and retrieval. These disks have a storage capacity of about 1 megabyte (1 million bytes or 8 million bits) and are anticipated to reach 10 megabytes in the near future. For purposes of illustration, a 5 megabyte disk will be assumed.

Assembled disk records from the DRA are the input for the Disk Read/Write module. In the "write" mode, records in the form of the data stream format previously described, will be written to disk storage as long as there is space available. Considering an average record to be 20 bytes of data the disk will contain about 240,000 records, each representing 0.01 seconds of real time. In addition the entire Waveform Catalog is written to disk after all space on the disk has been filled except for the 130 Kilobytes required for the Waveform Catalog itself.

In the retrieve mode, or playback, the Disk Read/Write Module first reads the Waveform Catalog from the disk into RAM. The waveform tables are then accessed by the Player module when called within each disk record. Each 0.01 second disk record is read from the disk serially to preserve its relationship to the real time of the original audio source material.

The Player module utilized in the present invention will preferably contain digital oscillators to produce the output signal and "smoothing" filters to eliminate the "steps" inherent in digital representations of continuous analog functions. Additive synthesis is the principal upon which the Player module's logic is based. Briefly summarized, additive synthesis theory states that complex musical signals can be constructed by summing all of the voltage components of the signal of each frequency subset at each instant in time. Thus, if the data reduction process preserves all of the original information about voltage versus time in such a way that it can be recombined precisely and in phase in time the output signal will equal the original input signal in each specified frequency or "pitch". In the preferred embodiment of the invention these conditions of additive synthesis are preserved at a level of perceptual resolution so that what the human ear will hear is indistinguishable from the original for most source material. The Player module then directs the oscillators to output at the frequencies specified by the disk records utilizing the waveform reference data to set the timbre of each oscillator and the broadband amplitude reference data sets the voltage levels. Synchronized timing is built into the system by definition of the 0.01 second cycle time upon which the system is based.

Figure 5:
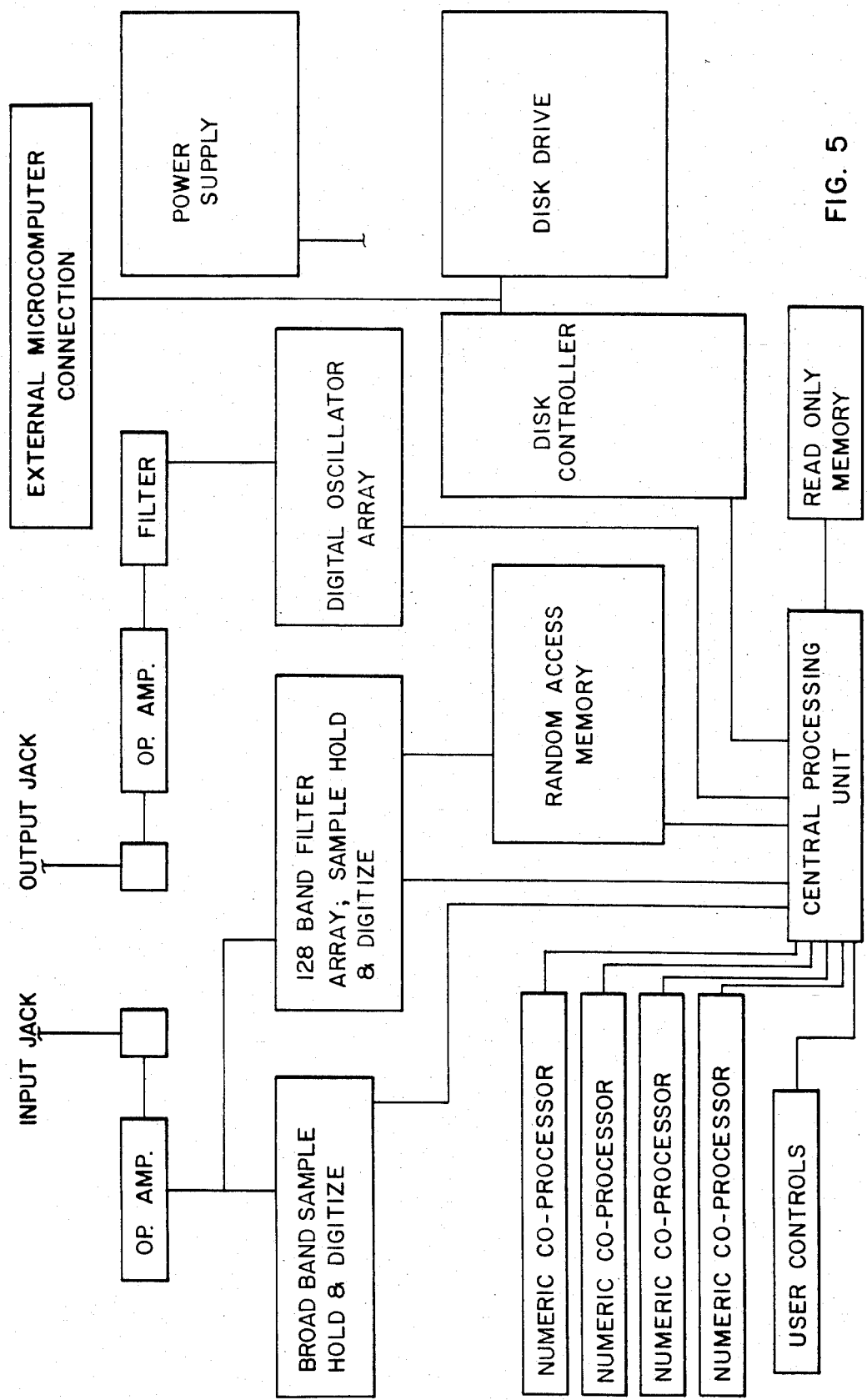
FIG. 5 is a diagramatic representation of the layout of the electronic components used in the present invention.

A most preferred embodiment of the system will employ Very Large Scale Integrated Circuit (VLSIs) technology to reduce logical groupings of circuit to single semiconductor chips, as opposed to the schematic representation shown in FIG. 5 which utilizes many "off the shelf" Integrated Circuit components.

Figure 2:
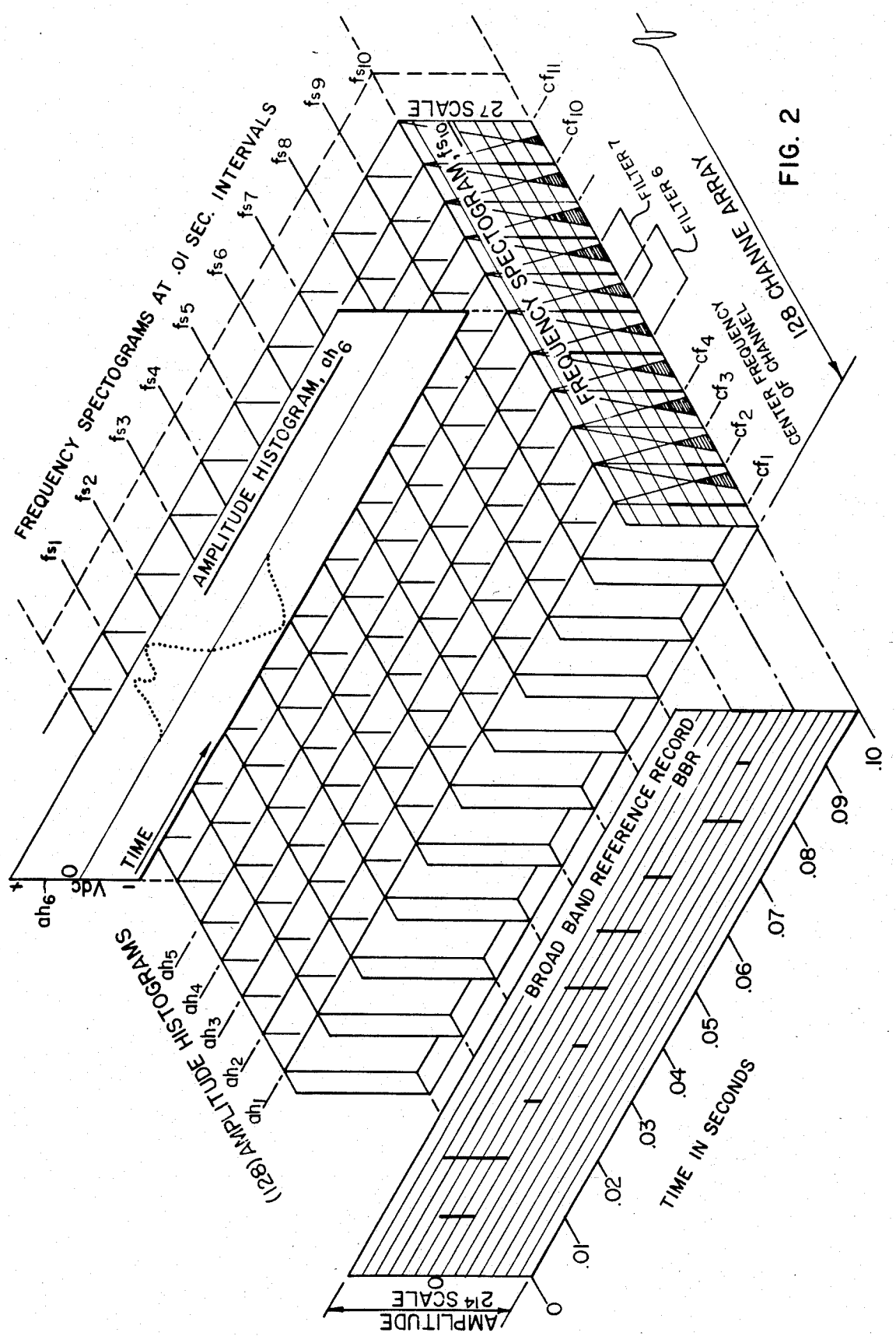
FIG. 2 is a pictorial representation of the analytical model of the function of the Data Acquisition Module of FIG. 1.

Referring now to FIG. 2 the analytic model is graphically depicted. The model has three reference axis dimensions of measurement; time, amplitude (dc voltage), and frequency. The time axis is divided into 0.01 second increments. It is important to the understanding of the system of the present invention to realize that the 0.01 second interval corresponds to the rate at which incremental acoustic "snapshots" of the audio signal are recorded. This increment was chosen because it is short enough that the human ear physiologically hears a sequence of 0.01 second changes in total signal as a continuous integrated whole. The stream of acoustic "snapshots" is directly analogous to the stream of "frames" in a motion picture film.

The acoustic "snapshots" themselves contain, in binary form, the total broadband (20 to 20,000 hz) amplitude, a frequency spectrogram and waveform table references obtained from the DAM (FIG. 1). The illustration in FIG. 2 amplitude histograms, such as ($ah_6$) shows the waveforms contained in the so-called "amplitude histograms" which are the raw data sets used to write the waveform tables. This will be discussed in greater detail hereinafter. The total broadband amplitude record is the reading, every 0.01 seconds, of a continuous digital stream of 14 bit words "written" by the broadband sample, hold and digitizing circuit at the rate of 42,000 "words" per second. Viewed another way this is like saying that only one word is saved for every 420 created. This series of amplitude readings is utilized from the RAM Buffer Module in the "playing" of the digital oscillators at the output end of the system. Every amplitude reading in every frequency channel is scaled to this reference level. Referring again to FIG. 2; (BBR) "broadband reference record" is a 2 dimensional data array in which the first term is the time value within the 0.10 second time frame incremented every 0.01 seconds (i.e. 0, 0.01, 0.02, seconds). The second term is the binary representation of the dc voltage level or amplitude at each time increment. The voltage level is recorded to the accuracy of a 14 bit word. This allows 16,384 discreet values for representation of the dc voltage range which may typically be from 0.05 volts to 5 volts i.e. 100 db. The absolute accuracy is thus 4.95 divided by 16,384 or ±0.0003 vdc.

It would be desirable to have this level of accuracy for the vdc measurement recorded in each bandpass filter channel. However, to achieve economy of storage space it is desirable to use as few bits as possible to represent the amplitude of the signal in each channel. To accomplish these contradictory goals the method of relative representation is adopted. Each frequency channel amplitude record is a bit word called a scaler value, that allows 128 values, which records each channel's signal as a proportion of the broadband value. Thus a channel with a vdc that is 0.250 vdc when the broadband value is 3.250 has a proportional value of 0.07692 with respect to the broadband signal. On a 7 bit scale this is a "3" out of 128. The second benefit of this approach is the increased speed of computation afforded by the comparative nature of modular arithmetic logic as opposed to the more time consuming logic for accumulating and encoding a 14 bit accurate "word" at each channel, thus utilizing a 7 bit word instead of a 14 bit word is a 50% savings in storage space.

Figure 3:
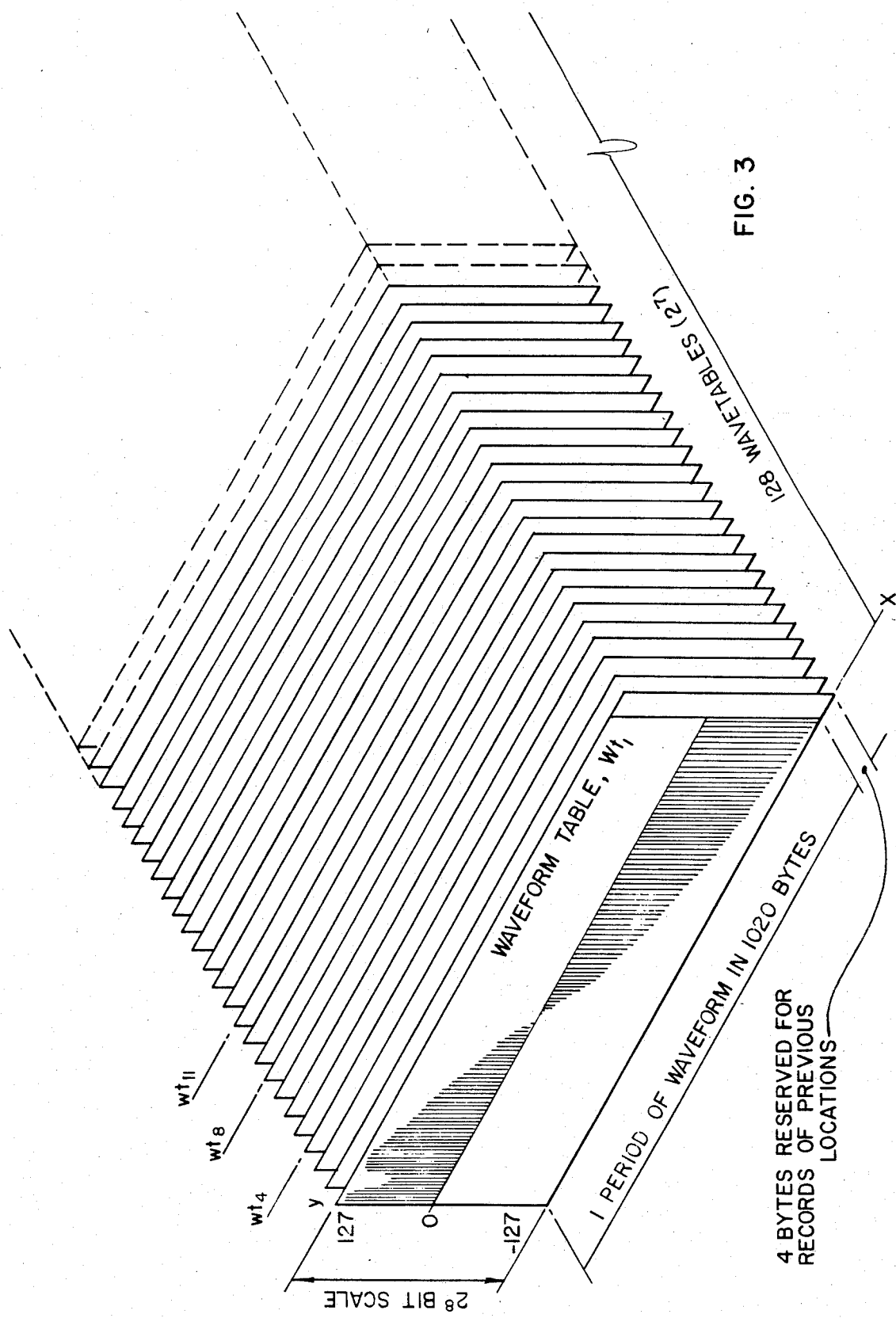
FIG. 3 contains a diagramatic representation of the recorded waveform data.

Referring now to FIG. 3, the frequency spectrogram Fs 10 is similar to the broadband amplitude record except that the amplitude of the voltage in each of 128 discreet narrow bandwidths is "saved" every 0.01 seconds. The 128 channels are sample, hold and digitizer circuits that are limited to the bandwidths they can "hear" by preselected digital bandpass filters. The distribution of the channels across the 20 to 20,000 hz audio range may be controlled by the user with equalizer type slide switches or may be automatically signal seeking. That is, the logic of the 128 channel array responds to the amplitude of the voltage in each of 128 discreet narrow band widths and "self-centers" around "live" bandwidths. This principal is the same as used in signal seeking radio receivers.

As representatively shown in FIG. 2, there can be overlaps between channels such as shown by the shaded triangular regions on the frequency spectrogram axis. A signal in the overlap region indicates to the system logic that the channel array is not "in tune" with the incoming digitized signal and can serve to set a flag value for correction that can be used by the automatic ranging circuit to "step over" to the next acoustic "snapshot" to get a centered channel reading.

The amplitude histograms, for example $ah_6$ in FIG. 2, are created whenever a channel is "live". These histograms are point by point amplitude versus time binary plots that are generated on a real time continuous basis. They are not 0.01 second "snapshots". The actual length in time required for plotting a histogram will vary with the audio frequency of the channel. It is generally conceded that the higher the frequency, the more data points will be required to "feed" the Waveform Analyzer and Coder. Of course, the upper limit in time for this process is 0.10 seconds or the synchronization of the entire system would be affected. The purpose of the amplitude histograms is to provide the "raw data" for the FFT or FDHT routines that operate the WAC. In order for the FFT to characterize a series of X-Y coordinates as a periodic curve function at least 2 complete cycles of the periodic function must be collected. In many cases, due to electronic recording logic circuit delays often referred to as "settling time" disturbances, more than 2 cycles worth of data must be collected for analysis.

Referring now to FIG. 3, the Wave Table Catalog information is graphically represented in its preferred form for the system. As soon as the Waveform Analyzer and Coder (FIG. 1), has "found" a waveform in an amplitude histogram (FIG. 2 $ah_6$) the waveform data for one period of the waveform is plotted on an X-Y coordinate system as shown graphically in wave table $wt_1$, of FIG. 3. The amplitude of the wave is plotted in the y dimension with 1,020 8 bit binary words that allow a precision of 127 steps above and below the x axis. The x axis itself is an arbitrary division of the waveform's period into 1,020 increments. The wave table has four bytes reserved for information about the tables status within the catalog of 128 tables. This is necessary since references to wave tables positions are made in each 0.01 second acoustic "snapshot" that may be revised as the recording proceeds and more or better information becomes available. Preferable all rewrites of wave table references are accomplished at the end of an entire recording session in one pass through the disk records.

Figure 4:
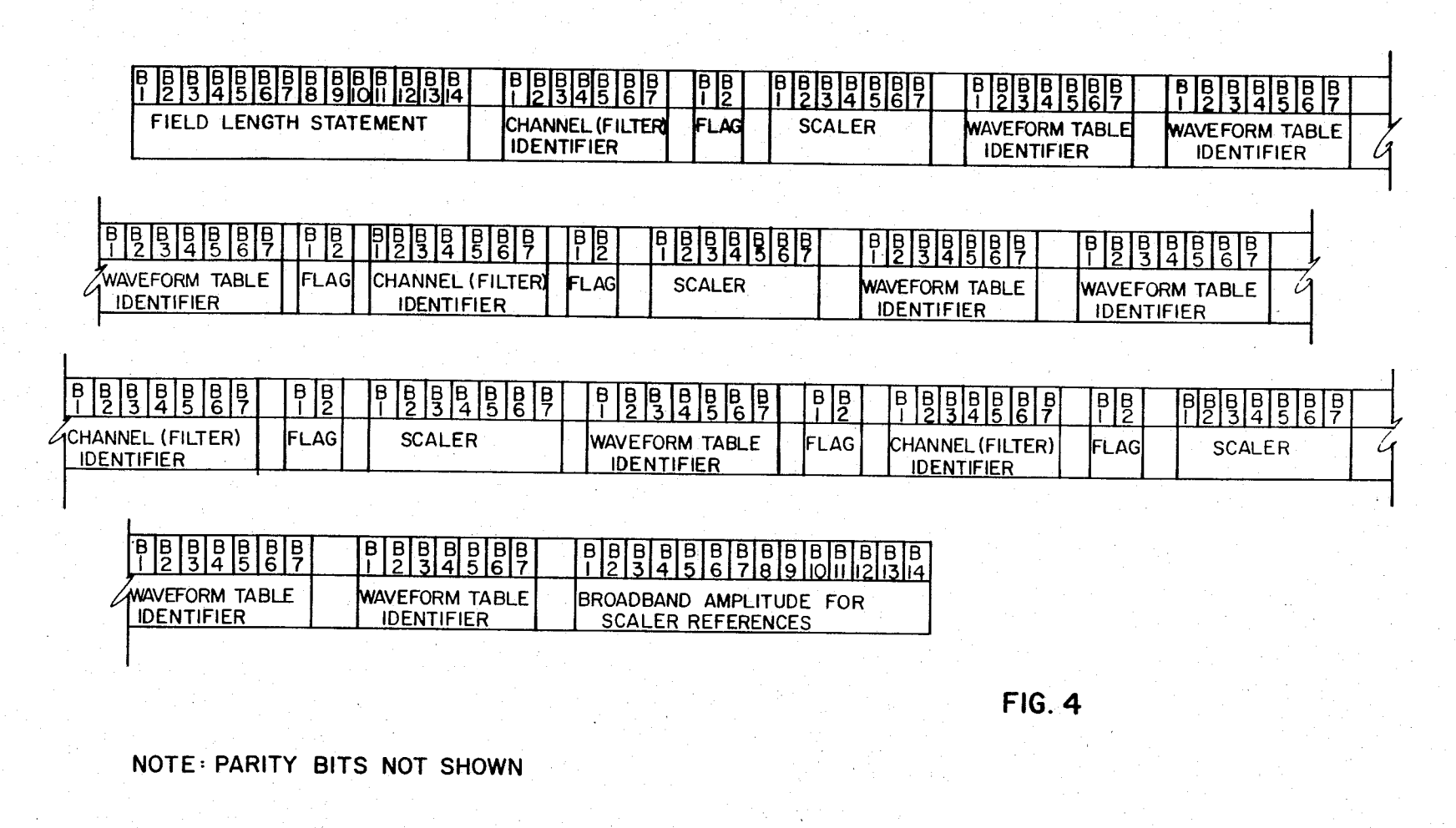

Referring to FIG. 4, the bit pattern for a typical acoustic "snapshot" is graphically depicted. An average diskette will contain 240,000 of these acoustic "snapshots". The first binary word is 14 bits long and is the binary number that is equal to the total number of bytes that follow in the acoustic "snapshot". This field length statement is necessary for control of the system data flow on playback. The "Player" module must be told by the controlling software how much data to buffer for 0.10 second of real time output. The following seven bit word tells the Player the first of the frequency identifiers contained in the acoustic "snapshot" followed by its two bit flag for frequency shifting, i.e. whether it is necessary or not, and in which direction. The third seven bit word is a binary number (from 1 to 128) that sets the relative amplitude (voltage level) for the previously stated frequency output. The forth seven bit word is a binary number (from 1 to 128) that tells the Player where to find the waveform in the waveform table that is to be addressed with the frequency previously stated. The fifth and sixth seven bit words are also waveform table references to be applied to the first frequency statement.

In operation, the "Player" reads through the acoustic "snapshot" (disk record) and then proceeds to "load" a digital oscillator circuit with the values it has located by reference and those it has read directly from the acoustic "snapshot". For example, in the case of the record shown in FIG. 4, there are four frequencies called for. Each of these has a known number of oscillation frequencies, they are the same as the channel bands. These frequencies are assigned to specific digital oscillators. The amount of energy to be used to drive the oscillator is specified by the relationship of the scaler to the broadband reference signal specified by the 14 bit word at the end of the acoustic "snapshot". The waveform table references are linked to the frequency oscillators in the same order that they appear in the acoustic "snapshot". Each oscillator acquires the characteristic sound represented by the sum of the waveforms applied to it by the Player. The number of times a wave table is read per second by the Player for an oscillator is a function of the frequency of the oscillator; i.e. a 440 hz oscillator cycles (or reads) a wave table at the rate of 440 times a second.

Referring to FIG. 5, a typical schematic layout of the components and their interconnections are shown for a preferred embodiment of the present invention. Comparing the requirements shown in FIG. 1, for the various functions with the capabilities of various available electronic components, one can practice the present invention by selecting components having the requisite capabilities. For example, the broad band digitizer used in the data acquisition module (DAM) can be selected from commercially available high speed analog to digital encoders such as are available from Hewlett Packard, Datel, Inc., Intel or R.C. Electronics. The 128 channel array in the DAM can also be obtained from Hewlett Packard to convert analog to digital with specified pass characteristics for each channel. Currently 16 channel components are available so that eight of such components would be required. As indicated in the Figures and the description contained herein, components such as the RAM should have up to 500k Byte capacity; Read Only Memory (ROM) 320k Bytes and the central processing unit (CPU) shown in FIG. 5 should preferably have 16 Byte 8 MHz capacity with multiple 80 Byte numeric data processor add on capacity. The disk drive unit shown may be replaced by any suitable means of digital read/write storage such as magnetic bubble memory packs, linear magnetic tape drives, laser based disks or fiches. The user control pad may offer tone, gain, range, track select and other additional features or it may be as simple as on/off, record/playback. Signal input and output is via conventional RCA type jacks.

The preferred embodiment of the present invention has been described with particular emphasis on the required functional characteristics of the components in the system logic that has been employed. It should be apparent that a wide variety of components may be applicable for use in the general system described to achieve the same or similar results. For example, different sampling rates, or the like may be employed advantageously with other components without departing from the spirit of the invention described. Indeed the recording and playback functions can be integrated or separate and indeed it will be possible that the record format disclosed could be used with a computer or computer communications link, such as a modem to transmit the recorded data to a remote playback facility.

Additionally, digital information can be broadcast by an rf signal to a remote location for loading a local memory unit with the requisite wave table information and then the digital data set information on the record can be transmitted for playback at the remote location. This can be done with relatively narrow bandwidth transmissions. The audio signal could then be reproduced by the playback unit at a remote location from the transmitted rf digital information. Again, this system has the advantage of achieving the high signal to noise ratio outputs which are inherent in digital communication systems.

The preferred embodiment of the present invention has been described in terms of the recording of sound and its playback. In addition to using the described system for audio playback, the output may be used for stimulating the auditory nerves in the manner achieved by hearing aids or artificial ears. No software changes would be necessary for achieving this output response.

The same concepts of the instant invention can apply equally well to medically related acoustic, EEG, or EKG analog signals. Here waveform tables established during a baseline medical exam using these non-invasive diagnostic techniques can be used to digitize and condense the analog signals during stress, post operative or post treatment diagnosis. The medical input could also be via an ultrasound probe and the instant invention could also store ultrasound images and analyze them for density and other sound wave detectable features.

The input of the present invention could also be a security listening device. The data streams of the instant invention would thus be indicative of security sound information. The random access memory would provide data for a comparison between potential break-in sound patterns and previously collected sound records. This would eliminate false trips of the alarm system. Memory disks could be changed to the use factor of the secured area. For example, a "week-end" disk would have an entirely different reference than a "night-shift" disk.

The input device could be vibration detection device acoustically coupled to a piece of machinery such as an electric dynamo, mill, or press in a manufacturing plant, or any other device incorporating bearings which are heavily or cyclically loaded. The analog input contains numerous frequency, amplitude, and waveform information which is indicative of the condition of these bearings. This information can be analyzed by the microcomputer system of the instant invention and used to detect the otherwise subtle changes in these signal parameters to predict impending bearing failure, or the like.

Figure 6:
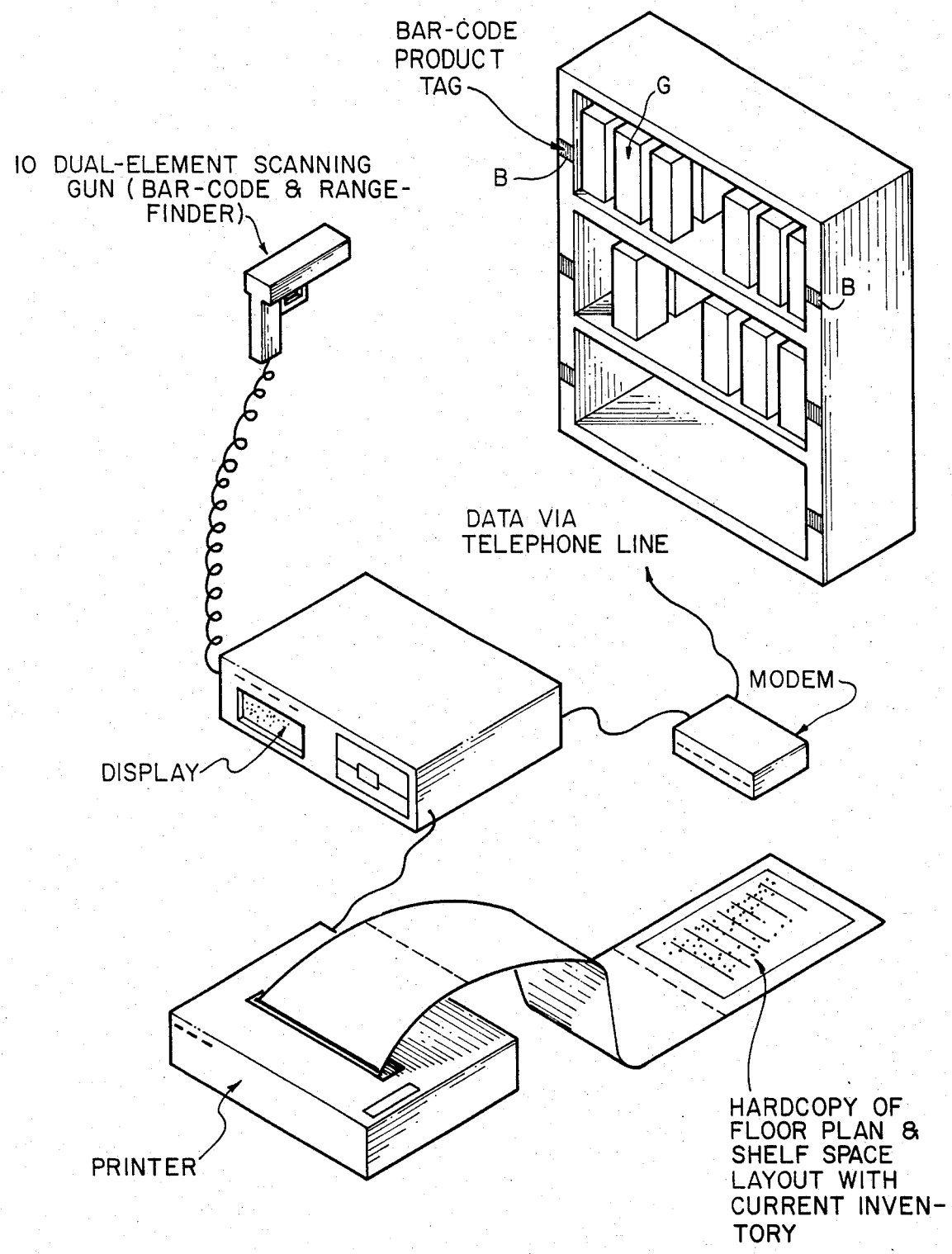
FIG. 6 is a pictorial representation of a warehouse inventory system.

FIG. 6 illustrates still another application of the microcomputer system disclosed supra. In this embodiment, an inventory detection and analysis system is disclosed. Here, the input to the data acquisition module of FIG. 1 is a hand held rangefinder device 10. Preferably, device 10 further includes a remote bar code reader of the holographic type. Device 10 is connected to a microcomputer system 12 (preferably of the type employing a battery power-pack for complete portability), incorporating the functional system of FIG. 1.

Goods G are arrayed on shelves in the location to be inventoried. Shelves also should incorporate bar codes B on at least one end of each shelf space. The goods should be stacked, if more than one deep, from the back of the shelves, leaving partially filled columns exposed for easy detection by device 10. The bar codes are commodity codes or other item specific designations describing the goods arrayed on the bar coded shelf. Alternatively, a key pad could be used to manually enter this information, before scanning each shelf with device 10. In operation, the portable microcomputer is initialized, and the disc record assembler module and other control codes are entered. The operator would stand in front of the goods G on shelves and if necessary, key in the goods description (commodity code, stock number, etc.). Where a bar code reader is incorporated in device 10, this step is not necessary. Device 10 is aimed at the shelved goods and is scanned along the full width of the shelf. A typical example of the resulting analog signal is shown in FIG. 7. This signal corresponds to the depth of space along the goods loaded shelf as a function of time as determined by the rangefinder echo. The time period in this case corresponding to the time between detection of the bar codes on the shelf uprights (where applicable) or the shelf uprights themselves.

This analog contains frequency, amplitude and wave form characteristics which are manipulated, modified, and condensed to form the digital disc record as set forth supra. This digital record can later be sent via conventional modem to a central inventory control location for later display in graphic or tabular form.

An example of a non-acoustic output of the data compresser and recorder of the present invention would be its application to seismagraphic data recording, compression, and analysis. The output in this instance would be a "groomed" graph with features over a specified size and minus noise or reverberations beyond a specified order of harmonics.

Also, any sensor that outputs an analog waveform type of signal can use the instant invention as a data compressor and recorder. Examples of these sensors would include pressure transducers, flow meters, photodiodes, microwave receivers (radar and radio frequency), photocells, piezo electric devices, charge-coupled devices, and scintillation counters. Likewise, digital data that is representative of waveform data can be compressed, according to this invention, by first converting the digital data into analog signals which can then be processed by the system described herein according to the methods disclosed.

In the system described the process methodology for sampling, analyzing, coding and recording and then decoding and playback enables the system to achieve up to three hundred times the storage density of previous systems. The scope of the invention is therefore to be limited only by the prior art as applied to the appended claims.

What is claimed is:

1. A microcomputer recording system for recording analog signals in digital data form comprising:

converting means for converting an analog signal into at least three digital data streams, wherein the first of said digital data streams is a reference signal representative of the amplitude of a preselected range of frequencies in a relatively broad band width, and wherein the second of said data streams is produced by filtering the analog signal to produce a data stream indicative of a plurality of discrete frequencies encompassed by the bandwidth represented by said first data stream; and wherein the third of said digital data streams is a reference signal representative of the amplitude of the analog signal for each of said plurality of discrete frequencies;

sampling means for producing a sequential stream of digital data samples in each of said digital data streams, selection means for selecting a predetermined portion of the digital data samples produced by said sampling means in each digital data stream;

means for separately storing each of said predetermined portions of said digital data samples;

means for comparing said predetermined portion of said first reference data stream containing amplitude data with said predetermined portion of said second reference data stream containing frequency data to produce frequency spectrogram data representative of the frequency and amplitude of the original analog signal;

means for transforming said predetermined portion of said digital data samples selected from said third data stream into data representative of a time versus amplitude histogram for each discreet frequency;

means for providing selected waveform parameters;

means for comparing said histogram data with said selected waveform parameters and producing addressable waveform data representative of the waveform of the original analog signal;

means for sequentially assembling and storing said frequency spectrogram data and said amplitude reference data of said first data stream and said addressable waveform data for subsequent use.

2. A microcomputer recording and playback system for recording analog signals in digital data form and for playback by decoding the digital data and converting it to analog audio signals comprising:

converting means for converting an analog audio signal into at least three digital data streams, wherein the first of said digital data streams is a reference signal representative of the amplitude of a preselected range of audio frequencies in a relatively broadband width, and wherein the second of said data streams is produced by filtering the analog signal to produce a data stream indicative of a plurality of discrete frequencies encompassed by the bandwidth represented by said first data stream; and wherein the third of said digital data streams is a reference signal representative of the amplitude of the signal for each of said plurality of discrete frequencies;

sampling means for producing a sequential stream of digital data samples in each of said digital data streams, selection means for selecting a predetermined portion of the digital data samples produced by said sampling means in each digital data stream;

means for separately storing each of said predetermined portions of said digital data streams;

means for comparing said predetermined portion of said first reference data stream containing amplitude data with said predetermined portion of said second reference data stream containing frequency data to produce frequency spectrogram data representative of the frequency and amplitude of the original analog signal;

means for transforming said predetermined portion of said digital data samples selected from said third data stream into data representative of a time versus amplitude histogram for each discreet frequency;

means for providing selected waveform parameters;

means for comparing said histogram data with said selected waveform parameters and producing addressable waveform data representative of the waveform of the original analog signal;

means for sequentially assembling and storing said frequency spectrogram data and said amplitude reference data of said first data stream and said addressable waveform data for subsequent use; and playback means for converting said digital data streams to analog data for subsequent reproduction comprising:

addressing means for selecting said stored addressable waveform data representative of the original analog signal; and oscillator means for producing an analog signal responsive to said addressable waveform data, said frequency spectrogram data, and said amplitude reference data to produce a resultant analog signal suitable for use in a reproduction device.

3. The system of claim 2 wherein said analog signals are audio signals and said resultant analog signal is suitable for use in an audio reproduction device.

4. The system of claim 3 further comprising:

means for transmitting said frequency spectrogram data, amplitude reference data and addressable waveform data by an rf signal to said playback means.

5. A microcomputer playback system for reproducing an original analog signal from stored digital data comprising:

addressing means for selecting stored waveform data representative of analog signal waveforms detected by a recording apparatus; and oscillator means for producing an analog signal responsive to said selected waveform data and associated amplitude data to reproduce said original analog signal.

6. The system of claim 5 wherein said original analog signal is an audio signal.

7. An apparatus for recording incoming signals in digital form comprising:

means for providing an analog signal representative of an incoming signal;

data acquisition means for sampling and digitizing said analog signal to produce a full spectrum amplified digital signal and filtering said analog signal at a plurality of discrete frequencies to produce a filtered analog signal and sampling and digitizing said filtered analog signal to produce frequency spectrograms;

means for transforming said filtered analog signal into a plurality of amplitude histograms corresponding to said plurality of discreet frequencies;

buffer means for storing said plurality of amplitude histograms;

waveform analyzer means for extracting characteristic waveforms from said plurality of histograms and generating waveform tables in the form of a computer readable data base from said characteristic waveforms;

record assembler means for generating assembled records for storage from said waveform tables, said frequency spectrograms and said full spectrum amplitude digital signal.

8. The apparatus of claim 7 wherein said waveform analyzer means includes means for generating waveform tables using a Fast Fourier Transform.

9. The apparatus of claim 7 wherein said waveform analyzer means includes means for generating waveform tables using a Fast Delta Hademard Transform.

10. The apparatus of claim 7 wherein said waveform analyzer means includes means for generating waveform tables using the B-splines type of cubic splines transform.

11. The apparatus of claim 7 wherein said analog signal is an audio signal and wherein said record assembler means is a disk record assembler for generating assembled disk records for storage by a disk read/write module.

12. The apparatus of claim 11 wherein said means for providing an analog signal is a medical data detection device.

13. The apparatus of claim 11 wherein said means for providing an analog signal is an entry recognition data detection device in a security system.

14. The apparatus of claim 11 wherein said means for providing an analog signal is a vibration transducer in an incipient mechanical failure detection and alarm system.

15. The apparatus of claim 7 wherein said analog signal is an audio signal and said apparatus further including playback means for converting said assembled records into analog signals, wherein said playback analog signals are used to stimulate the auditory nerves in the hearing impaired.

16. The apparatus of claim 7 wherein said means for providing an analog signal is an acoustic rangefinder in an inventory recording and analysis system.

17. The apparatus of claim 7 wherein said means for providing an analog signal is a seismic searcher.

18. A method of recording analog signals in digital form comprising the steps of:

converting said analog signal into at least three digital data streams, wherein the first of said digital data streams is a reference signal representative of the sum of the amplitudes of a preselected range of frequencies in a relatively broadband width, and wherein the second of said data streams is produced by filtering the analog signal to produce a plurality of frequency channels indicative of a series of discrete frequencies encompassed by the bandwidth of said first data stream; and wherein the third of said digital data streams is a series of reference signals representative of amplitude signals of said second data stream frequency channels;

producing a sequential stream of digital data samples in each of said digital data streams;

selecting a predetermined portion of each said digital data sample of each said digital data stream;

storing each of said selected predetermined portions of said digital data samples;

comparing said predetermined portion of said first digital data stream containing amplitude data with said predetermined portion of said second data stream containing frequency data to produce frequency spectrogram data representative of the frequency and amplitude of the original analog signal;

transforming said predetermined portion of said data samples selected from said third data stream into data representative of a time versus amplitude histogram for each said discreet frequency providing selected waveform parameters;

comparing said histogram data with said selected waveform parameters and producing addressable data representative of the waveform of the original analog signal;

assembling and storing said frequency spectrogram data and said amplitude reference data of said first data stream and said addressable waveform data for subsequent use.

19. A method of recording analog audio signals in digital data form and converting the digital data back into an analog audio signal capable of being played in an audio reproduction device comprising the steps of:

converting an analog audio signal into at least three digital data streams, wherein the first of said digital data streams is reference signal representative of the sum of the amplitudes of a preselected range of audio frequencies in a relatively broad bandwidth, and wherein the second of said data streams is produced by filtering the analog audio signal to produce a plurality of frequency channels indicative of a series of discrete frequencies encompassed by the bandwidth of said first data stream; and wherein the third of said digital data streams is a series of reference signals representative of amplitude signals of said second data stream frequency channels;

producing a sequential stream of digital data samples in each of said digital data streams;

selecting a predetermined portion of each said digital data sample of each said digital data stream;

storing each of said selected predetermined portions of said digital data samples;

comparing said predetermined portion of said first digital data stream containing amplitude data with data stream containing frequency data to produce frequency spectrogram data representative of the frequency and amplitude of the original analog signal;

transforming said predetermined portion of said data samples selected from said third data stream into data representative of a time versus amplitude histogram for each said discreet frequency;

comparing said histogram data with said selected waveform parameters and producing addressable data representative of the waveform of the original analog signal;

sequentially assembling and storing said frequency spectrogram data and said amplitude reference data of said first data stream and said addressable waveform data for subsequent use;

addressing the stored addressable waveform data, frequency spectrogram data, and amplitude reference data representative of the original audio signal to produce a resultant signal; and converting the resultant signal from digital to analog form.

20. The method of claim 19 comprising the further steps of:

transmitting said frequency spectrogram data, said amplitude reference data and said addressable waveform data by an rf signal.

21. A method of recording incoming signals in digital form comprising:

providing a analog signal representative of an incoming signal;

sampling and digitizing said analog signal to produce a full spectrum amplitude digital signal;

filtering said analog signal at a plurality of discrete frequencies to produce a filtered analog signal;

sampling and digitizing said filtered analog signal to produce frequency spectrograms;

generating a plurality histograms from said filtered analog signal representative of the amplitude versus time for each discrete frequency of said plurality of discreet frequencies;

extracting characteristic waveforms from said plurality of histograms; and generating waveform tables in the form of a computer readable data base from said characteristic waveforms;

generating assembled disk records for storage on a disk read/write module from said waveform tables, said frequency spectrograms and said full spectrum amplitude digital signal.

22. The method of claim 21 wherein said step of generating waveform tables comprises generating waveform tables using a Fast Fourier Transform.

23. The method of claim 21 wherein said step of generating waveform tables comprises generating waveform tables using a Fast Delta Hadamard Transform.

24. The method of claim 21 wherein said step of generating waveform tables comprises waveform tables using the B-splines type of cubic splines transform.

25. A method of reproducing an analog signal from assembled waveform tables generated from histograms of characteristic waveforms of said analog signal, frequency spectrograms and full spectrum digital amplitude signals comprising:

addressing waveform, frequency and amplitude data provided by said histograms, spectrograms and amplitude signals; and converting said waveform, frequency and amplitude data from digital to analog form.

26. The method of claim 25 further comprising:

transmitting digital data from said assembled waveform tables by an rf signal.

* * * * *